United States Patent
Gerst et al.

(10) Patent No.: US 6,759,490 B1
(45) Date of Patent: Jul. 6, 2004

(54) METHOD FOR PRODUCING AQUEOUS POLYMER DISPERSIONS

(75) Inventors: Matthias Gerst, Neustadt (DE); Gerhard Auchter, Bad Dürkheim (DE); Bernhard Schuler, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 290 days.

(21) Appl. No.: 10/048,985

(22) PCT Filed: Aug. 18, 2000

(86) PCT No.: PCT/EP00/08100

§ 371 (c)(1),
(2), (4) Date: Feb. 19, 2002

(87) PCT Pub. No.: WO01/14426

PCT Pub. Date: Mar. 1, 2001

(30) Foreign Application Priority Data

Aug. 19, 1999 (DE) .......................................... 199 39 325

(51) Int. Cl.$^7$ ............................ C08F 2/22; C09J 157/00

(52) U.S. Cl. ............................ 526/86; 526/87; 526/88; 526/318.4; 526/318.44; 526/318.45; 526/318.6; 526/329.2

(58) Field of Search ............................ 526/86, 87, 88, 526/318.4, 318.44, 318.45, 318.6, 329.2

(56) References Cited

U.S. PATENT DOCUMENTS

| 4,628,071 | A | 12/1986 | Morgan |
| 6,214,925 | B1 | 4/2001 | Schuler et al. |
| 6,225,401 | B1 * | 5/2001 | Rehmer et al. ............. 524/800 |
| 6,254,985 | B1 | 7/2001 | Gerst et al. |

FOREIGN PATENT DOCUMENTS

| CA | 2127919 A * | 3/1995 | ............ B27K/3/02 |
| DE | 196 33 967 | 2/1996 | |
| EP | 0 065 162 | 11/1982 | |
| EP | 0 644 205 | 3/1995 | |
| WO | 97/12921 | 4/1997 | |

* cited by examiner

Primary Examiner—Kelechi C. Egwim
(74) Attorney, Agent, or Firm—Oblon, Spivak, McClelland, Maier & Neustadt, P.C.

(57) ABSTRACT

The invention provides a process for preparing an aqueous polymer dispersion of a copolymer CP of at least two different monomers M1 and M2 by free-radical aqueous emulsion polymerization of the monomers M in the presence of at least one initiator, at least 80% of the monomers M and at least 75% of the initiator being supplied continuously to the polymerization reaction during its course, which comprises changing the rate at which the initiator is supplied to the polymerization reaction a number of times, or continuously, during the polymerization reaction. The invention further provides the polymer dispersions obtainable by this process, polymer powders prepared therefrom, and for the use of the dispersions and/or of the polymer powders to prepare pressure sensitive adhesives.

14 Claims, No Drawings

METHOD FOR PRODUCING AQUEOUS POLYMER DISPERSIONS

The present invention relates to a process for preparing aqueous polymer dispersions comprising at least one copolymer CP in the form of dispersed polymer particles which is composed of ethylenically unsaturated monomers M. The invention also relates to the aqueous polymer dispersions obtainable by this process and to polymer powders prepared from them. The present invention further relates to the use of these polymer dispersions in adhesive formulations, especially in pressure sensitive adhesives.

Aqueous polymer dispersions find diverse application, for example, as coating compositions or as impregnants for paper or leather, as binders in emulsion paints, filling compounds or synthetic-resin-bound plasters, for example, as modifiers for binding mineral building materials, and as adhesives or adhesive base materials.

In the case of adhesives a fundamental problem posed is that for firm and dimensionally stable bonding of the substrates it is necessary to ensure both good adhesion of the adhesive on the substrate to be bonded and at the same time to ensure internal strength of the adhesive film (cohesion). Adhesion and cohesion cannot generally be optimized independently of one another. There is a desire for measures which either raise the level of both properties or at least retain one property unchanged while improving the other. This problem has a role to play in the case, in particular, of pressure sensitive adhesives.

Pressure sensitive adhesives (PSAs) form a permanently tacky film which adheres to a very wide variety of surfaces even—as their name suggests—under slight pressure at room temperature. Pressure sensitive adhesives are used to produce self-adhesive products, such as labels, tapes and films. Products of this kind are very easy to use and make it possible to work rapidly when bonding. In contrast to contact adhesive compositions, no ventilation times are necessary. Moreover, there is no "open time" within which the adhesive bond must be made. The quality of a self-adhesive article depends essentially on whether the cohesion (internal strength of the film of adhesive) and its adhesion (to the surface that is to be bonded) are in tune with one another in accordance with the application.

In the case of pressure sensitive adhesives for labels, in particular, the level of cohesion must be sufficient for no stringing and no emergence of glue at the edges to occur in the course of stamping and cutting, since otherwise the cutting tools become soiled and the cut faces sticky. At the same time, the adhesion should be at a high level in order to provide good sticking on the substrate that is to be bonded.

DE 196 33 967 discloses a process for preparing highly concentrated aqueous dispersions of pressure sensitive adhesive in which the polymerization is conducted in accordance with a special feed technique in the presence of less than 50 ppm of polymerization inhibitor.

DE 196 32 203 discloses pressure sensitive adhesives whose adhesion is improved through the presence of small amounts of copolymerized styrene.

From the earlier patent application DE 198 18 394.1 it is known that in aqueous pressure sensitive adhesive formulations based on aqueous polymer dispersions the ratio of adhesion to cohesion can be improved by using aromatic emulsifiers.

WO 97/12921 describes a process for preparing aqueous polymer dispersions in which a monomer mixture which is altered during the polymerization is polymerized onto a seed latex. The polymers prepared by this process are used as coating materials. U.S. Pat. No. 3,804,881 describes a similar process operated in the absence of a seed latex.

It is an object of the present invention to provide aqueous polymer dispersions particularly suited to use as adhesives or adhesive base materials, i.e., as the adhesive component in adhesive formulations. The adhesives and adhesive formulations are to have a balanced profile of properties, i.e., good adhesion by the adhesive to the substrates to be bonded in combination with high strength of the adhesive film.

We have found that this object is achieved in that a process for preparing aqueous polymer dispersions by the method of free-radical aqueous emulsion polymerization of ethylenically unsaturated monomers M, in which the rate at which the polymerization initiator is supplied to the polymerization reaction is altered a number of times, or continuously, leads to aqueous polymer dispersions having improved technical performance properties, especially with respect to their use as pressure sensitive adhesives.

The present invention accordingly provides a process for preparing an aqueous polymer dispersion of a copolymer CP of at least two different monomers M1 and M2 by free-radical aqueous emulsion polymerization of the monomers M in the presence of at least one initiator, at least 80% of the monomers M and at least 75% of the initiator being supplied continuously to the polymerization reaction during its course, which comprises changing the rate at which the initiator is supplied to the polymerization reaction a number of times, or continuously, during the polymerization reaction.

Suitable monomers M are all mono- or polyethylenically unsaturated monomers which, alone or in combination with other monomers, may be polymerized by the method of a free-radical aqueous emulsion polymerization. Such monomers are known to the skilled worker and embrace vinyl, allyl and methallyl esters of aliphatic carboxylic acids having a linear or branched hydrocarbon structure, esters of monoethylenically unsaturated carboxylic acids with alkanols or cycloalkanols, olefins, conjugated dienes, vinylaromatic compounds, ethylenically unsaturated carboxylic acids, sulfonic acids, phosphonic acids, and functional monomers, e.g., crosslinkers and crosslinking monomers.

In general, the monomers M comprise at least one and preferably at least two hydrophobic monomers. Hydrophobic monomers are monomers whose solubility in water is generally less than 80 g/l, preferably less than 60 g/l, at 25° C. and 1 bar. The hydrophobic monomers generally make up at least 60% by weight, and preferably at least 70% by weight, of the monomers for polymerization.

With a view to the use of the polymer dispersions of the invention as adhesives or adhesive base materials, it has proven advantageous for the monomers for polymerization to comprise at least 60% by weight and up to 99% by weight, preferably from 70 to 98% by weight, and in particular from 80 to 95% by weight, of at least one hydrophobic monomer M1 whose homopolymer has a glass transition temperature $T_g \leq 0°$ C. Accordingly, the monomers M comprise at least 1% by weight and up to 40% by weight, preferably from 2 to 30% by weight, and in particular from at least 5 to 20% by weight, of monomer M2 which is copolymerizable with the monomers M1.

The glass transition temperature $T_g$ here is the midpoint temperature determined by differential thermoanalysis (DSC) in accordance with ASTM D 3418-82 (cf. Ullmann's Encyclopedia of Industrial Chemistry, 5th Edition, Volume A 21, VCH Weinheim 1992, p. 169 and Zosel, Farbe und Lack 82 (1976), pp. 125–134; see also DIN 53765). The glass transition temperature may also be determined from the measurement of the modulus of elasticity in the creep test as a function of temperature. Glass transition temperatures for the homopolymers of numerous monomers are known and are compiled, for example, in Ullmann's Encyclopedia of Industrial Chemistry, VCH, Weinheim, Vol. A 21 (1992) p. 169 or in J. Brandrup, E. H. Immergut, Polymer Handbook $3^{rd}$ ed, J. Wiley, New York 1989.

Hydrophobic monomers M1 of the invention are those having a limited solubility in water, as are commonly used for free-radical aqueous emulsion polymerization. Customary monomers M1 are selected from the vinyl esters of $C_3$–$C_{18}$ monocarboxylic acids, such as vinyl propionate, vinyl butyrate, vinyl valerate, vinyl hexanoate, vinyl 2-ethylhexanoate, vinyl decanoate, vinyl laurate, vinyl stearate, and vinyl esters of Versatic acids (Versatic acids are branched, aliphatic carboxylic acids having 5 to 11 carbon atoms). Typical monomers M1 further include the $C_2$–$C_{18}$ alkyl esters and $C_5$–$C_{10}$ cycloalkyl esters of acrylic acid, such as ethyl acrylate, n-propyl acrylate, isopropyl acrylate, n-butyl acrylate, 1-hexyl acrylate, 2-ethylhexyl acrylate, 2-lauryl acrylate, 2-stearyl acrylate, cyclopentyl acrylate, cyclohexyl acrylate, etc. Examples of monomers M1 are also the $C_1$–$C_{10}$ alkyl esters of maleic acid and of fumaric acid, such as dimethyl maleate, di-n-butyl maleate, and di-n-butyl fumarate. The monomers M1 also include conjugated dienes having preferably 4 to 10 carbon atoms, such as 1,3-butadiene, isoprene, or olefins having preferably 2 to 6 carbon atoms, such as ethylene, propene, 1-butene, and isobutene. Preferred monomers M1 are the $C_2$–$C_{10}$ esters of acrylic acid such as ethyl acrylate, n-butyl acrylate, and 2-ethylhexyl acrylate.

Suitable monomers M2 are all those monomers which are copolymerizable with the monomers M1 under the conditions of a free-radical aqueous emulsion polymerization. The monomers M2 include water-soluble monomers whose solubility in water is $\geq 80$ g/l at 25° C. and 1 bar (monomers M2a). The monomers M2 further include hydrophobic monomers M2b whose homopolymers have a glass transition temperature >0° C. In addition, the monomers M2 ay include crosslinking monomers M3, i.e., monomers having at least two nonconjugated ethylenically unsaturated double bonds, and crosslinkable monomers, i.e., monomers which in addition to an ethylenically unsaturated double bond have a further reactive functionality, for example, an anhydride group, an epoxide group, a ketocarbonyl group, or an aldehyde group (monomers M4).

The monomers M2 preferably comprise at least one monomer M2a, preferably in an amount of from 0.1 to 10% by weight and in particular in an amount of from 0.2 to 5% by weight, based on the total amount of monomers M, and at least one monomer M2b, preferably in an amount of from 0.9 to 39.9% by weight, in particular in an amount of from 1 to 30% by weight, and with particular preference in an amount of from 5 to 20% by weight, based on the monomers M.

The monomers M2a preferably comprise at least one monomer having one or more acid groups which may be deprotonated by a base in the aqueous polymer medium. Examples of suitable monomers M2a are $\alpha,\beta$-monoethylenically unsaturated mono- and dicarboxylic acids and also monoethylenically unsaturated sulfonic acids, phosphonic acids or dihydrogen phosphates and the water-soluble salts thereof, e.g., their alkali metal salts. Preferred monomers M2a are $\alpha,\beta$-monoethylenically unsaturated monocarboxylic acids having preferably 3 to 10 carbon atoms, examples being acrylic acid, methacrylic acid, crotonic acid, vinylacetic acid, acrylamidoglycolic acid, monoethylenically unsaturated dicarboxylic acids having preferably 4 to 10 carbon atoms, an example being itaconic acid, and the monoesters of monoethylenically unsaturated dicarboxylic acids, examples being monomethyl maleate and monobutyl maleate. Particularly preferred monomers containing an acid function are acrylic acid and methacrylic acid. Examples of monomers containing a sulfonic acid group are vinyl-, allyl- and methallylsulfonic acid and also 2-acrylamido-2-methylpropanesulfonic acid and the alkali metal salts thereof. In place of or together with the abovementioned ethylenically unsaturated carboxylic acids it is also possible to use their anhydrides. Said monomers M2a account, in accordance with the invention, for from 0.05 to 10% by weight, preferably from 0.05 to 5% by weight, and in particular from 0.05 to 2% by weight, based on the total weight of the monomers M.

In place of or together with the acid group monomers it is also possible to use neutral monomers M2a having an increased solubility in water. The neutral monomers M2a having an increased solubility in water include, for example, the amides and the N-alkylolamides of ethylenically unsaturated monocarboxylic acids, such as acrylamide, methacrylamide, N-methylolacrylamide, and N-methylolmethacrylamide. They further include the hydroxyalkyl esters of the abovementioned monoethylenically unsaturated mono- and dicarboxylic acids, such as hydroxyethyl acrylate, hydroxyethyl methacrylate, 3-hydroxypropyl acrylate, 3-hydroxypropyl methacrylate, 4-hydroxybutyl acrylate and 4-hydroxybutyl methacrylate. Preferred neutral monomers M2a are the hydroxyalkyl esters of monoethylenically unsaturated monocarboxylic acids. The neutral monomers M2a are usually used in an amount of from 0.05 to 10% by weight, in particular in an amount of from 0.1 to 5% by weight, based on the monomers M. The monomers M2a preferably include at least one monoethylenically unsaturated mono- or dicarboxylic acid, preferably in an amount of from 0.05 to 2% by weight, and at least one neutral monomer M2a, preferably in an amount of from 0.05 to 9.95% by weight, in particular in an amount of from 0.1 to 5% by weight, based in each case on the monomers M.

The monomers M2b include methyl acrylate, vinyl acetate, vinylaromatic monomers such as styrene, $\alpha$-methylstyrene, o-, m- and p-chlorostyrene, vinyltoluenes, and p-tert-butylstyrene. The monomers M2b further include tert-butyl acrylate and $C_1$–$C_4$ alkyl esters of methacrylic acid, such as methyl methacrylate, ethyl methacrylate, n-propyl and isopropyl methacrylate, n-butyl methacrylate, 2-butyl methacrylate, isobutyl methacrylate, and tert-butyl methacrylate. Preferred monomers M2b are the vinylaromatic monomers, especially styrene, and the $C_1$–$C_4$ alkyl esters of methacrylic acid, especially methyl methacrylate, and methacrylate.

One particularly preferred embodiment of the process of the invention and of the polymer dispersions prepared by it concerns those copolymers in which the monomers M2b comprise at least one vinylaromatic monomer, preferably in an amount of from 0.4 to 20% by weight, in particular in an amount of from 0.5 to 10% by weight, and with particular preference in an amount of from 1 to 5% by weight, and at least one $C_1$–$C_4$ alkyl ester of methacrylic acid, especially methyl methacrylate, preferably in an amount of from 0.5 to 35.5% by weight, in particular in an amount of from 1 to 20% by weight, and with particular preference in an amount of from 4 to 15% by weight, based in each case on the total amount of the monomers M.

Crosslinkable monomers M3 are used where desired in minor amounts, i.e., in amounts of from 0.01 to 2% by weight, based on the respective total monomer amount M. They preferably comprise monomers having two nonconjugated ethylenically unsaturated bonds, examples being the diesters of dihydric alcohols with α,β-monoethylenically unsaturated $C_3$–$C_8$ carboxylic acids, e.g., glycol bisacrylate, or esters of α,β-unsaturated carboxylic acids with alkenols, e.g., bicyclodecenyl (meth)acrylate, and also divinylbenzene, N,N'-divinylurea, N,N'divinylimidazolinone, diallyl phthalate etc. The monomers M preferably do not include any monomers M3.

Examples of crosslinkable, or bifunctional, monomers M4 are ethylenically unsaturated glycidyl ethers and glycidyl esters, examples being vinyl, allyl and methallyl glycidyl ether, glycidyl acrylate and glycidyl methacrylate, the anhydrides of α,β-monoethylenically unsaturated mono- and dicarboxylic acids, the diacetonylamides of the abovementioned ethylenically unsaturated carboxylic acids, e.g., diacetone(meth)acrylamide, and the esters of acetylacetic acid with the abovementioned hydroxyalkyl esters of ethylenically unsaturated carboxylic acids, e.g., acetylacetoxyethyl (meth)acrylate. These monomers may be present in the respective monomer mixtures in amounts of from 0.05 to 9.9% by weight, in particular in amounts of from 0.05 to 5% by weight. Monomers M4 allow the polymers P of the invention to be postcrosslinked with, for example, polyfunctional amines, hydrazides, or alcohols.

It has further proven advantageous for the polymer particles of the copolymer CP in the polymer dispersions of the invention to have an average particle diameter in the range from 50 to 1000 nm (as determined by means of an ultracentrifuge or by photon correlation spectroscopy; regarding particle size determination see W. Mächtle, Angew. Makromolekulare Chemie 1984, Vol. 185, 1025–1039, W. Mächtle, loc. cit. 1988, Vol. 162, 35–42). In the case of formulations having high solids contents, e.g., >50% by weight, based on the total weight of the formulation, it is advantageous on viscosity grounds if the weight-average particle diameter of the polymer particles in the dispersion is ≧100 nm. The average particle diameter will preferably not exceed 800 nm. It has also proven favorable if the particle diameters of the individual polymer particles vary over a wide range, and, in particular, if the size distribution has two or more maxima (polymer dispersions having a bimodal or polymodal polymer particle size distribution). Measures to adjust the polymer particle size distribution are known to the skilled worker (see, for example, EP-A 614 922 and documents cited therein).

The solids content of the polymer dispersions of the invention lies typically within the range from 30 to 75% by weight and preferably within the range from 40 to 70% by weight. For use in accordance with the invention it is of advantage if the solids content is as high as possible, i.e., amounts to at least 50% by weight.

The aqueous polymer dispersions of the invention are prepared by free-radical aqueous emulsion polymerization in accordance with a feed technique in the presence of at least one initiator, which triggers the free-radical polymerization of the monomers M, and of surface-active substances. The term feed technique denotes that at least 80%, preferably at least 90%, and in particular at least 95%, of the monomers for polymerization are supplied to the polymerization reaction under polymerization conditions. Accordingly, at least 75%, preferably at least 80%, of the initiator are supplied to the polymerization reaction under polymerization conditions.

Accordingly also, less than 20%, preferably less than 10%, and in particular less than 5%, of the monomers for polymerization are present in the polymerization vessel prior to the commencement of the polymerization. Prior to the commencement of the polymerization, the polymerization vessel contains generally water, a seed polymer if desired, surface-active substances if desired, and also, if desired, a portion of the monomers for polymerization and initiator. Preferably, the initial charge contains no monomers.

In accordance with the invention, prior to the commencement of the polymerization reaction, the initial charge contains not more than 25%, preferably not more than 20%, of the amount of initiator used overall for the polymerization.

In many cases, up to 25%, preferably not more than 20%, in particular from about 1 to 20%, with particular preference from 5 to 15%, of the total amount of initiator will be added to the polymerization in a first initiation phase, which in general accounts for not more than $\frac{1}{10}$ of the total duration of the polymerization. This addition of initiator may be made before or during the heating of the initial charge to polymerization temperature or to the initial charge which is at reaction temperature. It is preferred to add the initiator to the initial charge which is at polymerization temperature. In this first initiation phase, it is also possible to supply up to 20% of the monomer amount for polymerization, e.g., from 0.01 to 20% by weight, preferably from 0.02 to 10, in particular from 0.1 to 5% by weight, in one or more portions, or continuously, to the polymerization reactor (=prepolymerization phase), it being possible to add the monomers before, during or after the addition of the amount of initiator necessary for the initiation phase.

In accordance with the invention, the rate of initiator supply, i.e., the speed with which the initiator is supplied to the polymerization reaction, is changed a number of times, i.e., at least twice, preferably at least three times, in particular at least five times or, with very particular preference, continuously, in the course of the remaining time of the polymerization reaction following the initiation phase.

The rate of addition is preferably changed such that the change leads either to a continuous increase or to a continuous decrease in the rate of addition. It is likewise possible first to raise and then to slow the rate of initiator addition. Alternatively, starting from a high rate of addition, this rate can be initially reduced in the course of the addition and then raised again.

The rate of addition of initiator may be changed in stages, with the rate of addition remaining approximately constant within these stages. It may also he changed continuously during the addition.

Changes in the initiator addition rate are understood in accordance with the invention to be deliberate changes and not uncontrolled fluctuations which are manifested in deviations in the instantaneous rate of addition from the average rate of addition of less than 5%.

In general, the maximum value of the addition rate will deviate from the average addition rate by an amount of at least 10%, preferably at least 25%, in particular at least 40%, and with very particular preference at least 50%, based on said average rate, i.e., the initiator addition rate averaged over the time following the end of the initiation phase. Similar comments apply to the minimum value of the addition rate.

Following, if appropriate, the initiation phase, if such a phase is provided, it is particularly preferred to commence at a low initiator addition rate and then to raise this rate in the course of the polymerization reaction. Preferably, the rate of initiator addition toward the end of the addition of initiator takes on at least twice the value it had at the beginning of the addition of initiator. In particular, the value of the initiator addition rate rises to at least 4 times, with particular preference at least 8 times, and with very particular preference at least 12 times, the initial value.

Preferably, following, if appropriate, the initiation phase, if such a phase is provided, the addition of initiator takes place in parallel with the addition of the monomers; in other words, the addition of initiator is commenced and ended virtually synchronously with the monomer addition.

The polymerization initiator is preferably supplied as a dilute aqueous solution to the polymerization reaction. This initiator solution preferably contains less than 25% by weight, e.g., from 1 to 20% by weight, preferably from 1 to 10% by weight, of initiator, based on the total weight of the initiator solution.

The monomers to be polymerized may be added in bulk or as an aqueous emulsion which preferably comprises a surface-active compound. The addition of the monomers M is made preferably in the form of an aqueous emulsion containing at least one surface-active substance. The monomers M are preferably added at a virtually constant addition rate, based on the total monomer amount added in the time stage. This means that the rate at which the monomers M are supplied to the polymerization reaction deviates by less than 20% from the initial value and preferably by less than 10%, in particular less than 5%, from the average value, i.e., over the total period of addition (if appropriate, following an initiation phase if provided).

In one preferred embodiment of the present invention, the composition of the monomers supplied changes during their addition. The general procedure for this purpose is that the fraction of one monomer type increases or decreases during the addition in relation to the fractions of the other monomer types in the monomer mixture supplied. The increase or decrease may be effected in stages, the proportion of the monomers present in the monomer mixture M remaining virtually constant during these stages. Alternatively, the change may be made continuously.

It is preferred in accordance with the invention during the polymerization reaction to hold approximately constant the rate at which the monomers M1 are supplied to the polymerization reaction. Where the monomers M2 comprise two different monomers—for example, one monomer M2a and at least one monomer M2b—it is preferred to change only the proportion of the monomers M2a/M2b in the course of the polymerization reaction. For this purpose it is possible to proceed such that at the beginning of the polymerization reaction one of the monomer types is totally or almost totally absent from the supplied monomer mixture and reaches its maximum fraction toward the end of the polymerization reaction. It is also possible to proceed in such a way that this monomer type has a maximum fraction in the supplied monomers at the beginning of the polymerization reaction, said fraction falling, in the course of the polymerization reaction, to a value of zero or near zero by its end.

Where the monomers M for polymerization comprise at least one monomer M2a having an acid function, such as a monoethylenically unsaturated mono- or dicarboxylic acid, for example, it has proven suitable for the fraction of the carboxylic acid in the supplied monomers to have a maximum value at the beginning of the polymerization reaction, which value falls during the polymerization reaction. This applies in particular when the carboxylic acid supplied is acrylic acid or methacrylic acid.

The change to the monomer composition of the supplied monomers M may be realized in a variety of ways. One particularly simple method is to supply them by way of at least two separate monomer feed streams differing in composition. In this case, in general, the addition rate of the one monomer feed stream is increased a number of times, or continuously, during the polymerization reaction, while the rate of addition of the other monomer feed stream is reduced continuously during the addition of monomer. The two monomer feed streams differ only in one or two monomer types preferably such that one or the other monomer type is absent from one monomer feed stream. This method has proven particularly suitable when the monomers are to be supplied in the form of an aqueous monomer emulsion. Where the second monomer feed stream contains only a small fraction of the monomers M to be supplied, it is also possible to run the first monomer feed stream at a constant addition rate and to change only the addition rate of the second monomer feed stream in the desired manner.

In accordance with another method, use is made of a feed vessel from which a defined amount of the monomer to be polymerized is supplied continuously to the polymerization reaction. At the beginning of the polymerization, this stock vessel contains one or more monomer types (monomers M'). During the addition of the monomers M', one or more other monomer types (monomers M") are introduced continuously or in portions into the addition vessel and mixed thoroughly with the monomers M'. In this way a continuous or staged increase is achieved in the fraction of the added monomer types M", based on the monomer types M' already present in the feed vessel at the beginning of the polymerization reaction.

The two abovementioned methods have proven particularly suitable if the monomer type whose fraction is to be changed accounts for only a small fraction based on the total monomer composition.

A particularly elegant process is that known as inline mixing. In this case the monomers are blended in the particular desired monomer ratio shortly before their supply to the polymerization reactor. This method has also proven suitable when the monomers are supplied to the polymerization reaction in the form of an aqueous monomer emulsion. In this case it is necessary for the monomers for polymerization, in the respectively desired proportion, to be emulsified in the aqueous phase shortly before supply to the reactor (inline emulsification). Processes for inline emulsification are known from the prior art, e.g., from WO 98/23650. Inline emulsification generally takes place by mixing of the water, the surface-active substance and the monomers M for polymerization to an emulsion in a customary mixing device. Such mixing devices comprise, in general, a dynamic mixer and/or a static mixer. Preferred mixers are what are termed inline mixers, especially continuous tube mixers, toothed wheel dispersers, which are used alone or in combination with a static mixer. The supply of the components to the mixer is generally made by way of separate feed ports equipped with metering valves to enable the composition of the monomer feed stream to be adjusted simply. For further details of mixers for inline emulsification, reference is hereby made to the disclosure content of WO 98/23650.

Suitable free-radical polymerization initiators fundamentally include both inorganic peroxides and hydroperoxides, e.g., hydrogen peroxide, peroxodisulfates such as sodium peroxodisulfate, ammonium peroxodisulfate, and organic peroxides or hydroperoxides, e.g., tert-butyl hydroperoxide, and azo compounds. Preferred initiators are sodium peroxodisulfate or ammonium peroxodisulfate. Preference is also given to redox initiator systems which are composed of at least one organic reducing agent and at least one peroxide and/or hydroperoxide. Examples thereof are combinations of tert-butyl hydroperoxide with ascorbic acid or with at least one sulfur compound, e.g., the sodium salt of hydroxymethanesulfinic acid, sodium sulfite, sodium disulfite, sodium thiosulfate or acetone bisulfite adduct; or combinations of hydrogen peroxide with ascorbic acid or with at least one of the abovementioned sulfur compounds. The redox initiator systems may further include a small amount of a metal compound which is soluble in the polymerization medium and whose metallic component is able to exist in a plurality of valence states; iron(II) sulfate together if desired with EDTA, vanadium salts, etc. The amount of the free-radical initiator systems used, based on the total amount of the monomers for polymerization, is preferably from 0.1 to 5% by weight.

If desired, substances which reduce the molecular weight of the polymers are used in the polymerization. Such substances are generally used in amounts of up to 1% by weight, based on the monomer M. Preferably, the molecular weight regulators, if desired, are used in an amount of from 0.01 to 0.5% by weight, based on the monomers M. They are generally supplied to the polymerization reaction during the polymerization, for example, by way of a separate feed as a regulator solution, or in the monomers supplied. Examples of molecular weight regulators are organic sulfur compounds, silanes, halogenated hydrocarbons, allyl alcohols, and aldehydes. Preferred molecular weight regulators are those having a thiol group, e.g., thioglycolic acid, thioglycolic acid alkyl esters, mercaptoethanol, and linear or branched alkyl mercaptans such as tert-butyl mercaptan and tert-dodecyl mercaptan.

Surface-active substances suitable for conducting the emulsion polymerization are the emulsifiers and protective colloids commonly used for these purposes. The surface-active substances are usually used in amounts of up to 10% by weight, preferably from 0.1 to 5% by weight, and in particular from 0.5 to 4% by weight, based on the monomers to be polymerized.

Examples of suitable protective colloids are polyvinyl alcohols, starch derivatives and cellulose derivatives, or vinyl pyrrolidone copolymers. A detailed description of further suitable protective colloids is given in Houben-Weyl, Methoden der organischen Chemie, Volume XIV/1, Makromolekulare Stoffe [macromolecular substances], Georg-Thieme-Verlag, Stuttgart 1961, pp. 411–420. Mixtures of emulsifiers and/or protective colloids may also be used. It is preferred as surface-active substances to use exclusively emulsifiers, whose relative molecular weights, unlike those of the protective colloids, are usually below 2000. Preference is given to the use of at least one anionic emulsifier, alone or in combination with a nonionic emulsifier.

The anionic emulsifiers include alkali metal salts and ammonium salts of alkyl sulfates (alkyl: $C_8$–$C_{12}$), of dialkyl esters of sulfosuccinic acid (alkyl: $C_4$–$C_{10}$), of sulfuric monoesters with ethoxylated alkanols (EO units: 2 to 50, alkyl: $C_{12}$ to $C_{18}$) and with ethoxylated alkylphenols (EO units: 3 to 50, alkyl: $C_4$–$C_{10}$), of alkylsulfonic acids (alkyl: $C_{12}$–$C_{18}$) and of alkylarylsulfonic acids (alkyl: $C_9$ to $C_{18}$). The anionic surface-active substances also include monoalkyl and dialkyl derivatives of sulfonylphenoxybenzenesulfonic acid salts, especially their sodium, potassium or calcium salts. The alkyl groups in these compounds have generally 6 to 18 and especially 6, 12 or 16 carbon atoms. Use is frequently made of technical mixtures containing a fraction of from 50 to 90% by weight of the monoalkylated product. These compounds are general knowledge, from U.S. Pat. No. 4,269,749, for example, and are obtainable commercially, for example, as Dowfax® 2A1 (trademark of the Dow Chemical Company).

Suitable nonionic emulsifiers are araliphatic or aliphatic nonionic emulsifiers, examples being ethoxylated mono-, di- and trialkylphenols (EO units: 3 to 50, alkyl: $C_4$–$C_9$), ethoxylates of long-chain alcohols (EO units: 3 to 50, alkyl: $C_8$–$C_{36}$), and also polyethylene oxide/polypropylene oxide block copolymers. Preference is given to ethoxylates of long-chain alkanols (alkyl: $C_{10}$–$C_{22}$, average degree of ethoxylation: from 3 to 50) and, of these, particular preference to those based on oxo alcohols and naturally occurring alcohols having a linear or branched $C_{12}$–$C_{18}$ alkyl radical and a degree of ethoxylation of from 8 to 50.

Further suitable emulsifiers can be found in Houben-Weyl, Methoden der organischen Chemie, Volume XIV/1, Makromolekulare Stoffe, Georg-Thieme-Verlag, Stuttgart, 1961, pp. 192–208.

The surface-active substances used to prepare the polymer dispersions of the invention preferably include at least one anionic emulsifier. It has proven advantageous for the stability of the polymer dispersions of the invention, especially with respect to mechanical loads such as shear forces, if at least one salt of a dialkyl ester of sulfosuccinic acid (linear or branched $C_4$–$C_{10}$ and especially $C_8$ alkyl radical), preferably an alkali metal salt and in particular the sodium salt, is used in preparing the dispersions of the invention or if such a salt is added to the finished polymer dispersion subsequent to the polymerization reaction.

The polymerization medium may consist either of water alone or else of mixtures of water and water-miscible organic liquids, such as methanol, ethanol, n-propanol, isopropanol, n-butanol, tert-butanol, tetrahydrofuran, formamide, and dimethylformamide, the fraction of these liquids, based on the polymerization medium, being usually less than 10% by weight. Preferably, water alone is used as the polymerization medium.

In addition to the seed-free preparation mode, it is also possible, for the purpose of establishing a defined polymer particle size, to effect the emulsion polymerization by the seed latex process or in the presence of seed latex prepared in situ. Such processes are known and may be found in the prior art (see EP-B 40 419, EP-A-614 922, EP-A-567 812 and literature cited therein, and also 'Encyclopedia of Polymer Science and Technology', Vol. 5, John Wiley & Sons Inc., New York 1966, p. 847).

In the seed latex process, the polymerization is conducted usually in the presence of from 0.001 to 3% by weight, and in particular from 0.01 to 1.5% by weight, of a seed latex (solids content of the seed latex, based on total monomer amount), preferably with seed latex introduced initially (initial-charge seed). The latex generally has a weight-average particle size of from 10 to 300 nm, and in particular from 20 to 150 nm. Its constituent monomers are generally monomers M2, for example, styrene, methyl methacrylate, n-butyl acrylate and mixtures thereof, it being possible for the seed latex to further contain in copolymerized form, to a minor extent, monomers M1 and/or M3, preferably less than 10% by weight, based on the total weight of the polymer particles in the seed latex.

It is preferred to operate in the presence of at least one seed latex or to prepare said latex by polymerizing a portion of the monomers M, e.g., from 0.01 to 20%, preferably from 0.02 to 10%, in the initiation phase (or prepolymerization phase) of the polymerization (referred to as in situ seed mode).

An initiation phase by adding a portion of the initiator amount in the manner described above may of course also be carried out in the presence of a separately prepared seed latex with or without the addition of further monomers M.

In many cases, as the initiation phase, a portion of the initiator is added to the seed latex present in the initial charge.

To remove residual monomers, it is common to follow the final polymerization stage by a deodorization by a physical route, for example, by distilling off the volatile monomers with steam, or by a chemical route. In the case of chemical deodorization, further initiator, for example, a redox initiator, is added after the end of the emulsion polymerization proper; that is, following a monomer conversion of at least 95%, or after the residual monomer content has been reduced to a level <5% by weight by physical deodorization.

It was surprisingly found that the process of the invention, i.e. changing the rate at which the initiator is supplied to the polymerization reaction, leads to a broader distribution of the molecular weight and an increased polydispersity $\overline{M}_w/\overline{M}_N$ of the obtained polymers. Polydispersity $\overline{M}_w/\overline{M}_N$ reflects the molecular weight distribution of the polymer chains and is usually defined as the ratio of weight average molecular weight $\overline{M}_w$ to number average molecular weight $\overline{M}_N$. The molecular weight distribution can be determined by means of known gel permeation chromatography (GPC) methods as described in the Examples. The molecular weight-distribution of the polymers obtained by the process according to the invention is generally characterized by a polydispersity $\overline{M}_w/\overline{M}_N$ of above 35.

The polymer dispersions of the invention are suitable, for example, for use as sealing or coating compositions, as binders for emulsion paints or synthetic-resin-bound putties, for modifying binding mineral building materials, such as concrete, loam or clay, for treating leather or textiles, for consolidating fiber nonwovens, especially as adhesives and as an adhesive component, i.e., as an adhesive base material, for adhesive formulations, especially for aqueous adhesive formulations, for example, in building adhesives, such as carpet adhesives or tile adhesives, pressure sensitive adhesives, and other adhesive formulations based on aqueous polymer dispersions. Thus; the polymer dispersions of the invention are distinguished by a balanced proportion of adhesion of the adhesive to the substrate to be bonded, and internal strength of the adhesive film. This profile of properties makes the polymer dispersions of the invention particularly suitable as pressure sensitive adhesives and as base materials for pressure sensitive adhesives. Accordingly, the present invention further provides for the use of the aqueous polymer dispersions of the invention as adhesives and adhesive base materials, especially as pressure sensitive adhesives.

The polymer dispersions of the invention, as they are or after compounding, may be used together with customary auxiliaries. Examples of customary auxiliaries are wetting agents, thickeners, defoamers, plasticizers, pigments, fillers, protective colloids, light stabilizers, and biocides.

In the case of use as pressure sensitive adhesives, the auxiliaries added to the polymer dispersions of the invention may also include tackifiers, i.e., tackifying resins. Tackifiers are known, for example, from Adhesives Age, July 1987, pp. 19–23, or Polym. Mater. Sci. Eng. 61, 1989, pp. 588 to 592. Examples of tackifiers are rosins and their derivatives. The rosins may be used, for example, in their salt form or, preferably, in esterified form. Further examples of tackifiers are hydrocarbon resins, examples being coumarone resins, polyterpene resins, indene resins, and hydrocarbon resins based on unsaturated hydrocarbons such as butadiene, pentene, methylbutene, isoprene, piperylene, divinylmethane, cyclopentene, cyclopentadiene, cyclohexene, cyclohexadiene, styrene, or vinyltoluene. Suitable tackifiers also include low molecular mass polymers of alkyl esters of acrylic acid and/or of methacrylic acid, which generally have a weight-average molecular weight below 30,000 and are composed to the extent of at least 60% by weight, in particular at least 80% by weight, of alkyl (meth)acrylates. Preferred tackifiers are natural or chemically modified rosins. They consist predominantly of abietic acid or its derivatives.

Where desired, the tackifiers are used in amounts of up to 100% by weight, preferably from 5 to 50% by weight, based on the stage polymer of the invention, in the adhesive formulation. A feature of the dispersions of the invention is that they may also be used without tackifiers.

The polymer dispersions of the invention may also be dried to polymer powders by known processes of the prior art.

The pressure sensitive adhesive formulations may be applied to substrates by customary methods, such as by rolling, knife coating, brushing, etc. The water present in the adhesive formulation may be removed by drying at ambient temperature or at elevated temperature in the range, for example, of from 50 to 150° C. Suitable substrates include not only paper and cardboard but also polymer films, especially those of polyethylene, oriented polypropylene, polyamide, which may be biaxially or monoaxially oriented, polyethylene terephthalate, polyamide, polystyrene, polyvinyl chloride, polyacetate, cellophane, polymer films coated with metal (e.g., aluminum, by vapor deposition)—(known as metallized films for short)—and metal foils, e.g., of aluminum. Said films and foils may also have been printed, for example, with printing inks. For subsequent use, the PSA-coated side of the substrate, for example, of labels, may be lined with a release paper, e.g., with siliconized paper.

The examples given below are intended to illustrate the invention without restricting it.

I PREPARATION EXAMPLES

I.1 Comparative Example C1

In a polymerization reactor, 3.636 g of a styrene seed (diameter about 30 nm, 33%) in 200 g of water were heated with stirring to 90° C. Over the course of 2 minutes, 10% (i.e., 6.88 g) of a solution of 4.80 g of sodium peroxodisulfate in 64 g of water (initiator solution; concentration 7% by weight) were added with stirring. After 5 minutes, feed stream 1 was commenced and was added over the course of 270 minutes to the polymerization reactor. Synchronously with feed stream 1, the addition of the remaining 90% of the initiator solution was commenced and was made at constant rate over the course of 270 minutes into the polymerization reactor. After the end of feed stream 1, 3.5 g of a 70% strength solution of tert-butyl hydroperoxide in 20.6 g of water, and, synchronously, a solution of 2.4 g of sodium disulfite in a mixture of 24.8 g of water and 1.44 g of acetone, were metered in with stirring at 90° C. for the purpose of deodorization. To the resulting mixture there were added over 15 minutes, at 90° C., 16.8 g of an aqueous solution (50% strength) of a sulfosuccinic acid dioctyl ester. The solids content of the dispersion was adjusted to 56%.

Feed Stream 1:
- 596.1 g of water
- 40.0 g of emulsifier solution 1
- 5.3 g of emulsifier solution 2
- 24.0 g of a 10% strength aqueous solution of sodium hydroxide 6.5 g of acrylic acid AA
26.0 g of hydroxypropyl acrylate HPA
104.4 g of methyl methacrylate MMA
26.0 g of styrene S
1037.0 g of 2-ethylhexyl acrylate EHA Emulsifier solution 1: 30% strength aqueous solution of the sodium salt of the sulfuric monoester of dodecanol ethoxylated with 30 ethylene oxide units (Disponil FES77)

Emulsifier solution 2: a 45% strength aqueous solution of the sodium salt of diphenyl ether derivatized with a $C_{12}$–$C_{14}$ alkyl radical and with two sulfonyl radicals (Dowfax 2A1)

I.2 Inventive Example E1 "Rising NaPS Gradient"

The reaction was carried out in the manner described for Comparative Example C1, 10% of the initiator solution (4.8 g of sodium peroxodisulfate in 187.4 g of water) and the remaining 90% of the initiator solution as feed stream 2 being metered at 30-minute intervals as follows, beginning synchronously with the monomer addition: 2 g, 6 g, 11 g, 15 g, 19 g, 24 g, 28 g, 32 g, 36 g in 30 minutes in each case.

I.3 Inventive Example E2 "Falling Acrylic Acid Gradient, Rising NaPS Gradient"

Preparation took place as described in Example 1 except that the monomer feed stream 1 was divided into a feed stream 1 and a feed stream 3.

Feed Stream 1:
  236.7 g of water
  20.0 g of emulsifier solution 1
  2.7 g of emulsifier solution 2
  12.0 g of a 10% strength aqueous solution of sodium hydroxide
  6.5 g of acrylic acid AA
  13.0 g of hydroxypropyl acrylate HPA
  52.2 g of methyl methacrylate MMA
  13.0 g of styrene S
  518.5 g of 2-ethylhexyl acrylate EHA Feed Stream 3:
  236.0 g of water
  20.0 g of emulsifier solution 1
  2.7 g of emulsifier solution 2
  12.0 g of a 10% strength aqueous solution of sodium hydroxide
  13.0 g of hydroxypropyl acrylate HPA
  52.2 g of methyl methacrylate MMA
  13.0 g of styrene S
  518.5 g of 2-ethylhexyl acrylate EHA The feed streams ⅓ were metered in as follows: 184 g/11 g, 162 g/32 g, 140 g/54 g, 119 g/75 g, 97 g/96 g, 76 g/118 g, 54 g/139 g, 32 g/161 g, 11 g/182 g in 30 minutes in each case.

Feed stream 2 as follows: 2 g, 6 g, 11 g, 15 g, 19 g, 24 g, 28 g, 32 g, 36 g in 30 minutes in each case.

I.4 Comparative Example C2 "Falling Acrylic Acid Gradient, Rising Styrene Gradient"

Preparation took place as described in Comparative Example C1 except that the monomer feed stream 1 was divided into a feed stream 1 and a feed stream 3.

Feed Stream 1:
  295.0 g of water
  20.0 g of emulsifier solution 1
  2.7 g of emulsifier solution 2
  12.0 g of a 10% strength aqueous solution of sodium hydroxide
  6.5 g of acrylic acid AA
  13.0 g of hydroxypropyl acrylate HPA
  52.2 g of methyl methacrylate MMA
  518.5 g of 2-ethylhexyl acrylate EHA Feed Stream 3:
  301.1 g of water
  20.0 g of emulsifier solution 1
  2.7 g of emulsifier solution 2
  2.0 g of a 10% strength aqueous solution of sodium hydroxide
  13.0 g of hydroxypropyl acrylate HPA
  52.2 g of methyl methacrylate MMA
  26.0 g of styrene S
  518.5 g of 2-ethylhexyl acrylate EHA The feed streams ⅓ were metered in as follows: 193 g/12 g, 170 g/35 g, 148 g/58 g, 125 g/82 g, 102 g/105 g, 79 g/128 g, 57 g/152 g, 34 g/175 g, 11 g/198 g in 30 minutes in each case.

I.5 Inventive Example E3 "Falling Acrylic Acid Gradient, Rising S Gradient, Rising NaPS Gradient"

Preparation took place as described in Example 1 except that the monomer feed stream 1 was divided into a feed stream 1 and a feed stream 3.

Feed Stream 1:
  235.0 g of water
  20.0 g of emulsifier solution 1
  2.7 g of emulsifier solution 2
  12.0 g of a 10% strength aqueous solution of sodium hydroxide
  6.5 g of acrylic acid AS 13.0 g of hydroxypropyl acrylate HPA
  52.2 g of methyl methacrylate MMA
  518.5 g of 2-ethylhexyl acrylate EHA Feed Stream 3:
  237.7 g of water
  20.0 g of emulsifier solution 1
  2.7 g of emulsifier solution 2
  12.0 g of a 10% strength aqueous solution of sodium hydroxide
  13.0 g of hydroxypropyl acrylate HPA
  52.2 g of methyl methacrylate MMA
  26.0 g of styrene S
  518.5 g of 2-ethylhexyl acrylate EHA The feed streams ⅓ were metered in as follows: 180 g/11 g, 159 g/33 g, 138 g/54 g, 117 g/76 g, 96 g/98 g, 74 g/120 g, 53 g/142 g, 32 g/163 g, 11 g/185 g in 30 minutes in each case.

Feed stream 2 as follows: 2 g, 6 g, 11 g, 15 g, 19 g, 24 g, 28 g, 32 g, 36 g in 30 minutes in each case.

I.6 Example E4 "Falling Acrylic Acid Gradient, Falling Styrene Gradient, Rising NaPS Gradient"

Preparation took place as described in Example 1 except that the monomer feed stream 1 was divided into a feed stream 1 and a feed stream 3.

Feed Stream 1:
- 240.0 g of water
- 20.0 g of emulsifier solution 1
- 2.7 g of emulsifier solution 2
- 12.0 g of a 10% strength aqueous solution of sodium hydroxide
- 6.5 g of acrylic acid AA
- 13.0 g of hydroxypropyl acrylate HPA
- 52.2 g of methyl methacrylate MMA
- 26.0 g of styrene S
- 518.5 g of 2-ethylhexyl acrylate ERA Feed Stream 3:
- 232.7 g of water
- 20.0 g of emulsifier solution 1
- 2.7 g of emulsifier solution 2
- 2.0 g of a 10% strength aqueous solution of sodium hydroxide
- 13.0 g of hydroxypropyl acrylate HPA
- 52.2 g of methyl methacrylate MMA
- 518.5 g of 2-ethylhexyl acrylate EHA The feed streams ⅓ were metered in as follows: 187 g/11 g, 165 g/32 g, 143 g/53 g, 121 g/74 g, 99 g/95 g, 77 g/115 g, 55 g/136 g, 33 g/157 g, 11 g/178 g in 30 minutes in each case.

Feed stream 2 as follows: 2 g, 6 g, 11 g, 15 g, 19 g, 24 g, 28 g, 32 g, 36 g in 30 minutes in each case.

II Performance Testing a) Production of the Test Strips

The test dispersion is applied to siliconized paper in a thin film, using a coating bar, and is dried at 90° C. for 3 minutes. The gap size of the coating bar is chosen so as to give an application rate of 19–21 g/m² for the dried adhesive. A commercially customary OPP film (thickness 30μ, pretreated) is applied to the dried adhesive and rolled on firmly using a manual roller. The film laminate produced in this way is cut into strips 2.5 cm wide. Prior to testing, these strips are stored under standard atmospheric conditions for at least 24 h.

b) Testing the Shear Strength (K, in Accordance with FINAT FTM 7)

The siliconized paper is peeled off and then the test strip is bonded to the edge of an Afera metal test panel so as to give a bond area of 6.25 cm². 10 minutes after bonding, a 1000 g weight is fastened to the protruding end of the film and the metal test panel is suspended vertically. Ambient conditions: 23° C., 50% relative atmospheric humidity. The shear strength is taken as the time, in minutes, until the adhesive bond fails under the load of the weight, as the mean from the results of two test specimens.

c) Testing the Peel Strength (in Accordance with FINAT FTM 1)

The siliconized paper is peeled off and then a 2.5 cm wide test strip is bonded to a steel test panel and to polyethylene. Ambient conditions: 23° C., 50% relative atmospheric humidity. 1 minute after bonding, the strip is peeled off at an angle of 180° and at a rate of 300 mm/min with the aid of a tensile testing machine. The peel strength is reported as the mean force, in N/2.5 cm, required to do this.

Additionally, the fracture image is assessed. The abbreviations have the following meanings:

A=adhesive fracture, no residue on the stainless steel panel

C=cohesive fracture (separation within the adhesive)

TABLE 1

Adhesion values

| No. | P (Afera) | FI | C | FI |
|---|---|---|---|---|
| C1 | 6.2 | A | 753 | C |
| E1 | 6.5 | A | 1036 | C |
| E2 | 5.5 | A | >7200 | C |
| C2 | 5.6 | A | 942 | C |
| E3 | 5.0 | A | 5496 | C |
| E4 | 5.2 | A | >7200 | C |

P (Afera): peel strength on steel, immediate; C: cohesion in [min] on Afera; FI: fracture image

III Molecular Weight Distribution

The molecular weight distribution of the polymers of the working examples were determined by gel permeation chromatography (gpc). The GPC was carried out over 3 mixed B columns (l=300 mm, d=7.5 mm, loaded with PL-gel from Polymer Laboratories), which were connected in series. The mobile phase used was tetrahydrofuran (analytical grade). The samples were diluted with deionized water to a solids content of 0.25% by weight and chromatographed at a flow rate of 1.0 ml/min and at 21° C. Detection was by UV spectrometry at a wavelength of 254 nm and via the refractive index. Commercial polystyrene standards (Polymer Laboratories, Molecular weight 500–10,000,000 daltons) were used for calibration. The results are compiled in Table 2.

TABLE 2

| working example No. | $\overline{M}_N$ [Dalton] | $\overline{M}_w$ [Dalton] | $\overline{M}_w/\overline{M}_N$ [Dalton] |
|---|---|---|---|
| C1 | 4,000 | 141,000 | 35.0 |
| E1 | 5,000 | 181,000 | 36.0 |
| E2 | 4,200 | 187,000 | 44.2 |
| C2 | 4,800 | 153,000 | 31.7 |
| E3 | 4,600 | 176,000 | 38.4 |
| E4 | 3,900 | 181,000 | 46.8 |

We claim:

1. A process for preparing an aqueous polymer dispersion of a copolymer CP of at least two different monomers M1 and M2 by free-radical aqueous emulsion polymerization of the monomers M in the presence of at least one initiator, at least 80% of the monomers M and at least 75% of the initiator being supplied continuously to the polymerization reaction during its course, which comprises changing both the rate at which the initiator is supplied to the polymerization reaction and the ratio of the monomers M1:M2 in the supplied monomers M a number of times, or continuously, during the polymerization reaction.

2. A process as claimed in claim 1, wherein the rate at which the initiator is supplied to the polymerization reaction is raised during the polymerization reaction.

3. A process as claimed in claim 1, wherein the rate at which the monomers M are supplied to the polymerization reaction changes by less than 20% relative to the initial value.

4. A process as claimed in claim 1, wherein the monomers M comprise:

from 60 to 99% by weight, based on the total monomer amount, of at least one hydrophobic monomer M1 whose homopolymer has a glass transition temperature $T_g \leq 0°$ C., and from 1 to 40% by weight, based on the total monomer amount, of at least one monomer M2 copolymerizable therewith.

5. A process as claimed in claim 4, wherein the monomers M2 comprise from 0.1 to 10% by weight based on the total monomer amount, of at least one monomer M2a having a solubility in water $\geq 80$ g/l (at 25° C.), and from 0.9 to 39.9% by weight, based on the total monomer amount, of at least one hydrophobic monomer M2b having a glass transition temperature $T_g > 0°$ C.

6. A process as claimed in claim 5, wherein the monomer M2a comprises at least one monoethylenically unsaturated monomer having an acid group.

7. A process as claimed in claim 5, wherein the fraction of the monomers M2a in the added monomers M is reduced in the course of the polymerization reaction.

8. An aqueous polymer dispersion obtained by a process as claimed in claim 1.

9. An aqueous polymer dispersion as claimed in claim 8, wherein the copolymer CP contains in copolymerized form from 60 to 99% by weight of monomers M1, from 0.1 to 10% by weight of monomers M2a, and from 0.9 to 39.9% by weight of monomers M2b, the weight fractions of the monomers M1, M2a and M2b adding up to 100% by weight.

10. An aqueous polymer dispersion as claimed in claim 8, wherein the monomers M2b comprise from 0.4 to 20% by weight of at least one vinylaromatic monomer, and from 0.5 to 35% by weight of at least one $C_1$–$C_4$ alkyl ester of methacrylic acid.

11. An aqueous polymer dispersion as claimed in claim 8, wherein the monomers M2a comprise from 0.05 to 2% by weight of at least one ethylenically unsaturated monomer having an acid group, and from 0.05 to 9.95% by weight of at least one neutral monomer.

12. A polymer powder obtained by spray drying the aqueous polymer dispersion from claim 8.

13. A pressure sensitive adhesive formulation comprising as adhesive base material at least one aqueous polymer dispersion as claimed in claim 8.

14. A pressure sensitive adhesive formulation comprising as adhesive base material at least one polymer powder as claimed in claim 12.

* * * * *